(12) United States Patent
Kircher

(10) Patent No.: US 12,741,740 B2
(45) Date of Patent: Sep. 22, 2026

(54) CABIN DIVIDER MOUNTING SYSTEM

(71) Applicant: Airbus Operations GmbH, Hamburg (DE)

(72) Inventor: Benedikt Kircher, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 225 days.

(21) Appl. No.: 18/640,375

(22) Filed: Apr. 19, 2024

(65) Prior Publication Data

US 2024/0351687 A1 Oct. 24, 2024

(30) Foreign Application Priority Data

Apr. 20, 2023 (EP) .................................... 23168990

(51) Int. Cl.
*B64D 11/00* (2006.01)

(52) U.S. Cl.
CPC ................................ *B64D 11/0023* (2013.01)

(58) Field of Classification Search
CPC .................................................. B64D 11/0023
USPC ......................................................... 160/330
See application file for complete search history.

(56) References Cited

U.S. PATENT DOCUMENTS 4,662,421 A 5/1987 Basmadji
5,086,540 A * 2/1992 Schumacher ...... B64D 11/0023 211/105.6
8,869,865 B2 * 10/2014 Roach ................ B64D 11/0023 160/84.04
9,856,695 B2 * 1/2018 Leadens ............. B64D 11/0023
9,868,528 B2 * 1/2018 Mayer ................ B64D 11/0023
10,556,685 B2 * 2/2020 Sexton ............... B64D 11/0023
10,737,788 B2 * 8/2020 Slyter ....................... A47H 1/18
10,793,276 B2 * 10/2020 Radacovici .......... B64D 11/003
10,919,632 B2 * 2/2021 Minyard ............. B64D 11/003
11,034,429 B2 * 6/2021 Tubbs ................ B64D 11/0015
11,370,547 B2 * 6/2022 Verbeque ........... B64D 11/0023
2008/0229547 A1 * 9/2008 Michel ............... B64D 11/0023 16/87 R
2009/0242149 A1 * 10/2009 Breuer ...................... B60P 3/36 160/368.1
2011/0296774 A1 * 12/2011 Tremaine, III ........... E06B 9/00 160/320
2012/0043028 A1 * 2/2012 Roach ................ B64D 11/0023 160/84.01
2014/0158310 A1 6/2014 Slyter
2015/0232167 A1 * 8/2015 Kircher .................. B64D 11/00 244/119

(Continued)

FOREIGN PATENT DOCUMENTS

EP 2520490 A1 11/2012

OTHER PUBLICATIONS

European Search Report for Application No. 23168990 dated Sep. 19, 2023.

*Primary Examiner* — Beth A Aubrey
(74) *Attorney, Agent, or Firm* — KDW Firm PLLC

(57) ABSTRACT

A mounting system for a cabin divider in an aircraft includes a curtain rail configured to hold and guide the cabin divider, a holding structure arranged at the curtain rail, a stretcher frame mounted to the holding structure, and a fabric cover spanned over the stretcher frame and covering the holding structure. Further disclosed is an aircraft having such mounting system.

13 Claims, 7 Drawing Sheets

(56) References Cited

U.S. PATENT DOCUMENTS

| | | | | |
|---|---|---|---|---|
| 2016/0059964 | A1 * | 3/2016 | Breuer | B64D 11/003 160/350 |
| 2016/0115721 | A1 * | 4/2016 | Leadens, II | B64D 11/0023 244/129.5 |
| 2018/0148172 | A1 * | 5/2018 | Verbeque | B64D 11/0023 |

* cited by examiner

CABIN DIVIDER MOUNTING SYSTEM

TECHNICAL FIELD

The present disclosure generally relates to a mounting system for a cabin divider in an aircraft and a corresponding aircraft having such mounting system. Particularly, the present disclosure relates to a mounting system for a cabin divider comprising a curtain rail, a holding structure and a fabric cover covering the holding structure. Furthermore, an aircraft having a cabin divider mounted to such mounting system is also disclosed.

BACKGROUND

A conventional header for a cabin divider is installed at a ceiling or close to an overhead bin in an aircraft. The header comprises a curtain rail for opening and closing a curtain, which together form the cabin divider. Such header is usually made from a plastic material, for example, corresponding to the material used for a lining or the overhead bin in the aircraft. This allows visual integration of the cabin divider header into the general look of the aircraft cabin.

However, such headers are bulky and usually heavy due to the material employed for manufacturing the header. The cabin divider has to be moved in a longitudinal direction of the aircraft quite often, particularly when changing the number of high class seats and economy class seats for the next flight. Thus, it is cumbersome for the aircraft personnel to move the bulky and heavy header.

SUMMARY

It is therefore an object of the present disclosure to provide a lightweight cabin divider.

This object is solved by the disclosure herein. Preferred embodiments are disclosed herein.

According to a first aspect to better understand the present disclosure, a mounting system for a cabin divider in an aircraft comprises a curtain rail configured to hold and guide the cabin divider, a holding structure arranged at the curtain rail, a stretcher frame mounted to the holding structure, and a fabric cover spanned over the stretcher frame and covering the holding structure.

Thus, the stretcher frame and fabric cover replace the heavy and bulky material conventionally used for such cabin divider header. Since particularly the fabric cover is much thinner and lighter than plastic materials, such as a lining material, the weight of the disclosed mounting system can be significantly reduced.

Moreover, the fabric cover is only spanned over the stretcher frame, so that it can be easily replaced by a new cover. Thus, a redesign of the aircraft cabin as well as a replacement in case of wear can be performed fast and in a cost-effective way. For instance, if the aircraft operator wants to change the interior design of the aircraft, this can be performed fast and cost-effective. Likewise, if the aircraft is sold to another operator, the adaptation of the cabin interior is not much of an obstacle for the new operator.

A plurality of passengers consider a fabric (textile) as a more valuable lining, so that the aircraft cabin can be graded up in an easy manner.

In an implementation variant, the mounting system can further comprise at least one flexible protrusion mounted to and protruding away from the holding structure or the stretcher frame. In other words, the flexible protrusion can be mounted to the holding structure and protrudes away from the holding structure. Alternatively or additionally, the flexible protrusion can be mounted to the stretcher frame and protrudes away from the stretcher frame. As a mere example, one end or side of the flexible protrusion can be mounted to the holding structure, while another end or side of the stretcher frame can be mounted to the stretcher frame.

The flexible protrusion may protrude towards an area, where a further interior component of the aircraft is, when the mounting structure is installed in the aircraft. Usually, such mounting structure is installed in a crown area close to a ceiling panel and/or an overhead bin of the aircraft cabin. Thus, the flexible protrusion allows closing a gap between the holding structure and the further interior component.

The fabric cover can be further spanned over the at least one flexible protrusion. This allows closing the gap with the fabric cover, so that the look and feel of the interior of the cabin is graded up. At conventional cabin divider headers such gaps are usually closed by an elastic plastic or rubber material, which may deteriorate faster than the remaining material of the conventional cabin divider header. Thus, the fabric cover closing the gap together with the lexical protrusion the look and feel of the cabin interior.

If the aircraft interior components move relative to one another, for example, due to turbulences, the cabin divider header of conventional aircraft cabins may scratch along another interior component, which can make an unwanted noise. Since the fabric cover and the flexible protrusion of the present disclosure are both elastic and the fabric cover has a smooth surface producing less friction than plastic materials, there will be no sound generated in case of such relative movement of interior aircraft components.

In a further implementation variant, the stretcher frame can comprise two side stretcher frames each arranged on a respective lateral side of the holding structure and/or a top stretcher frame arranged on a top side of the holding structure. These stretcher frames or stretcher frame portions allow providing the mounting system with any desired outer dimensions. In other words, the form of the side stretcher frame(s) and the top stretcher frame and define the outer edges and sides of the mounting system. Once the fabric cover is spanned over these stretcher frame(s)/portions, the outer shape of the mounting system is set. The lateral sides of the holding structure relate to lateral sides when viewing along a longitudinal axis of the mounting system.

The stretcher frame can substantially include a longitudinal frame element that runs along the longitudinal line or axis of the mounting system. For instance, if the mounting system has a substantially straight form, the longitudinal frame element is also substantially straight. If the mounting system has a curved form (in a top view and/or a side view), the longitudinal frame element follows this curved form.

Furthermore, each of the lateral side stretcher frames, i.e. their respective stretcher frame elements, may have the same form, so that all stretcher frame elements are arranged parallel to one another. Alternatively, one or more of the stretcher frame elements may have a different form. As a mere example, a first side stretcher frame may have a different form than a second side stretcher frame arranged on the opposite side of the mounting system. Thus, each side, associated with a respective cabin class, may have a different look and design.

Moreover, a stretcher frame element of a side stretcher frame may also form a stretcher frame element of the top stretcher frame. For instance, a corner (when contemplating a cross-section of the mounting system) may be formed by a single stretcher frame element associated with the side stretcher frame as well as the top stretcher frame.

It is to be understood that the stretcher frames or portions may also include frame elements that are arranged perpendicularly to the longitudinal direction of the mounting system. For instance, a frame element may also have a vertical or curved arrangement in the overall stretcher frame.

In yet a further implementation variant, the stretcher frame can comprise at least one longitudinal section (or frame element) arranged parallel to the curtain rail, and at least one spacer frame connecting the at least one longitudinal section with the holding structure. Such spacer frame is arranged in such a manner that it extends at least partially in a cross-sectional direction from the holding structure. In other words, the spacer frame provides a spacing of the longitudinal section from the holding structure in a cross-sectional direction.

The longitudinal section may correspond to a frame element of the side stretcher frame and/or top stretcher frame.

In another implementation variant, the at least one spacer frame can be flexible and/or configured to push the at least one longitudinal section away from the holding structure. Thus, the fabric cover is spanned and/or stretched, so that it has a neat appearance, comparable to a plastic lining. On the other hand, due to the flexibility of the at least one spacer frame, damages to the mounting system as well as injuries of passengers or aircraft personnel are reduced.

In yet another implementation variant, the holding structure can comprise a plurality of brackets configured to hold the stretcher frame. Each of such brackets is delimited in the longitudinal direction of the mounting system, i.e. it is not provided over the entire length of the mounting system. Thus, the mounting system can be made lightweight. For instance, each bracket may have side portions (lateral portions) to which the stretcher frame is mounted.

In addition, a link between the two side portions may be provided. Thus, the bracket can have a U-shape, the shape of an upside-down U, an H-shape, or the like. Alternatively, the bracket can simply be a horizontal plate, to which the stretcher frame is mounted.

In a further implementation variant, each of the plurality of brackets can be mounted to the curtain rail. As a mere example, the curtain rail may be designed as the main structural part. In other words, the curtain rail can be configured to carry the entire load of the mounting system between the longitudinal ends of the mounting system. In this case, the brackets are mounted to (e.g., on top of) the curtain rail and provide attachment points for the stretcher frame.

For example, the curtain rail can be arranged between the side portions of the bracket. Thus, a compact and statically resistant mounting system can be formed.

Furthermore, the mounting system can comprise brackets at particular intervals along the longitudinal direction. Thus, a statically equal distribution of loads between the stretcher frame and the holding structure can be achieved. Likewise, a bracket can be arranged, where the longitudinal form of the mounting system has a curvature. As a mere example, a bracket can be arranged in the centre of a curved portion of the curtain rail, so that an attachment point for the stretcher frame is provided at a corresponding curve centre position allowing the stretcher frame to follow the curvature of the curtain rail.

In another implementation variant, the holding structure can comprise at least one rod and a plurality of rod connectors, wherein each rod connector is configured to receive an end of the at least one rod. In other words, a rod connector together with rod form a longitudinal structure capable of carrying loads of the mounting system. The at least one rod is arranged substantially parallel to the curtain rail. Thus, the at least one rod has the same shape as the curtain rail.

Since the rod can carry the majority of loads of the mounting system, the curtain rail can be designed lighter and smaller, only with respect to the loads of the cabin divider coupled to the curtain rail.

In yet another implementation variant, one or more of the rod connectors can be configured to hold the stretcher frame. For instance, the one or more rod connectors can form an attachment point for the stretcher frame. Thus, the stretcher frame can be arranged to follow the shape of the curtain rail, i.e. can follow the shape of the at least one rod.

Since the at least one rod and rod connectors can be designed to carry the majority of the loads of the mounting system, the stretcher frame can be designed lighter, i.e. only in view of spanning the fabric cover.

In a further implementation variant, the holding structure can further comprise at least one interconnector configured to connect a pair of the plurality of rod connectors spaced apart from one another in a cross-sectional direction of the curtain rail. In other words, an interconnector arranges a pair of rod connectors in a cross-sectional plane of the mounting system (such plane can be arranged perpendicular to a longitudinal direction of the mounting system/the curtain rail at the corresponding position).

Furthermore, each of the pair of rod connectors can be configured to receive a respective end of a pair of rods, so that the pair of rods are arranged parallel to one another and parallel to the curtain rail.

It is to be understood that more than one interconnector can be arranged in the cross-sectional plane, so that more than two rods can be arranged parallel to one another. As a mere example, three interconnectors and three rod connectors can form a triangle with a rod connector at each corner. Thus, three rods can be attached to this triangle, which allows a three-dimensional structure that is statically very stable.

In addition, a corresponding arrangement of interconnector(s) and rod connector(s) can be provided at an opposite end of the rod(s), in order to complete the truss structure.

In yet a further implementation variant, the curtain rail can be coupled with the interconnector. Thus, the interconnector forms an attachment point for the curtain rail. As a mere example, if a triangle of interconnectors and rod connectors is formed the curtain rail may be coupled to an interconnector forming a bottom edge of the triangle.

In another implementation variant, the stretcher frame can be coupled with an interconnector. Thus, the interconnector forms an attachment point for the stretcher frame.

It is to be understood that an interconnector can be straight or curved, so that the structure formed by interconnector(s) and rod connector(s) can have any desired shape, including a circle, and ellipse, a triangle, or any polygonal and/or curved shape.

In another implementation variant, one of the at least one rod can be curved. Thus, the shape of the mounting system in the longitudinal direction can be freely designed and can be adapted to any interior constraints in the aircraft cabin.

Alternatively or additionally, one of the plurality of rod connectors can be curved, so that a pair of rods inserted into the rod connector on opposite sides are arranged at an angle. Such curved rod connector can have a curved shape or can have a distinct angle or bend.

In any case, the shape of the mounting system along its longitudinal direction can be freely designed and can be changed easily by replacing one or more rod connectors and/or one or more rods.

In yet another implementation variant, the mounting system can further comprise a keder rail mounted to the holding structure and/or to the stretcher frame. A keder rail is a rail having an interior recess of larger cross-sectional size/area than an opening into the recess.

The mounting system and then further comprises a cord. A welting is formed at an edge of the fabric cover around the cord, and the welting can be inserted into the keder rail. The welting relates to a seam or fold of the edge of the fabric cover, so that the edge surrounds the cord. If the folded or bend edge of the fabric cover is attached to the fabric cover (e.g., by stitching, adhering, welding or the like), the cord is captured inside of the welting. The size of the cord (particularly its diameter or cross-sectional area) is chosen to fit into the interior recess of the keder rail, so that only the fabric cover (or the portion of the fabric cover having the overlapping seam, fold or bend) runs through the opening into the interior recess of the keder rail.

Such attaching of the fabric cover to the holding structure allows a fast installation of the mounting system as well as a fast replacement of the fabric cover.

The keder rail can be integrated into the stretcher frame. For instance, one frame section can be formed as a keder rail, so that the number of components of the mounting system is reduced.

Alternatively, the keder rail can be coupled to or integrated into the curtain rail. Thus, the fabric cover can cover the entire mounting system and only leave the curtain rail open for insertion and movement of the cabin divider.

It is to be understood that the keder rail can run along the longitudinal direction of the mounting system. Additionally, the keder rail can form a lateral recess, in case the fabric cover should be excluded from certain portions of the mounting system.

In a further implementation variant, the mounting system can further comprise a sign mounted to the holding structure and/or to the stretcher frame. Such sign may be installed in the mounting system to inform passengers and/or personnel about certain incidents during a flight. As a mere example, the sign can be an "exit" sign, a sign indicating to buckle up, an occupancy indication of a lavatory, or the like.

Furthermore, the keder rail can be arranged to surround at least portions of the sign, so that the fabric cover does not cover the sign, but runs around it. In other words, the keder rail forms a lateral recess for the sign.

According to a second aspect to better understand the present disclosure, an aircraft comprises at least one mounting system of the first aspect or one of its variants or examples.

In an implementation variant, the aircraft can further comprise a cabin divider mounted to the curtain rail of one of the at least one mounting system.

The present disclosure is not restricted to the aspects and variants in the described form and order. Specifically, the description of aspects and variants is not to be understood as a specific limiting grouping of features. It is to be understood that the present disclosure also covers combinations of the aspects and variants. Thus, each variant or optional feature can be combined with any other aspect, variant, optional feature or even combinations thereof.

BRIEF DESCRIPTION OF THE DRAWINGS

In the following, the present disclosure will further be described with reference to example implementations illustrated in the figures, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other implementations that depart from these specific details.

Figure 1:
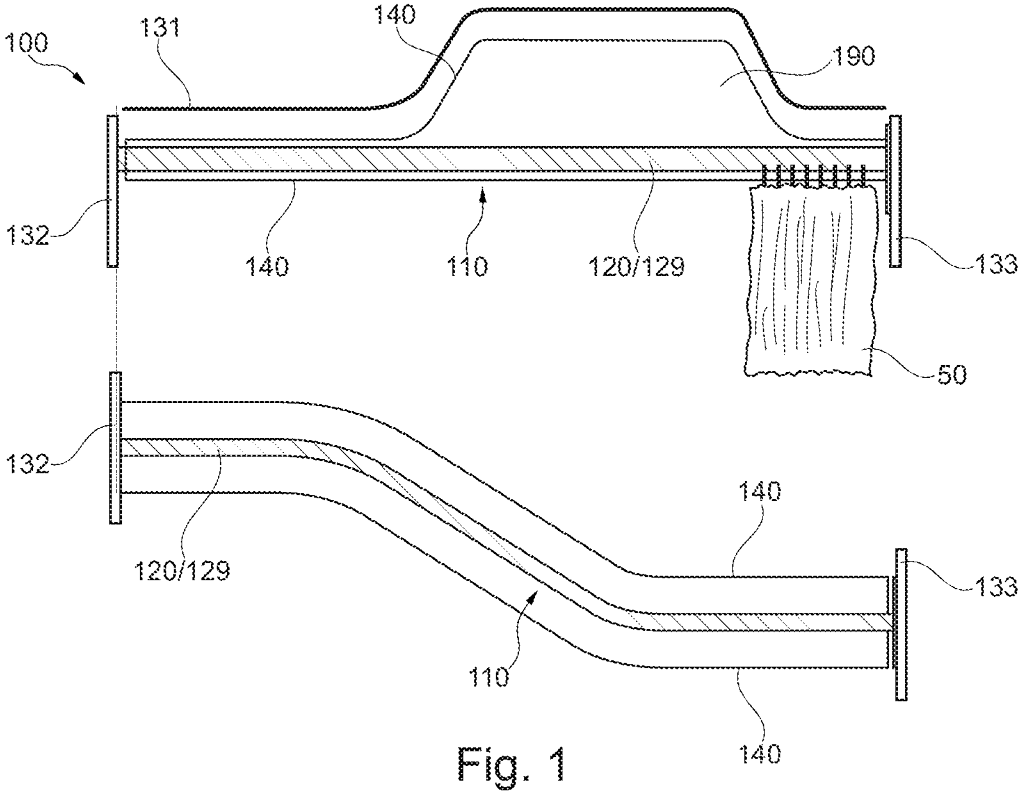
FIG. 1 schematically illustrates a side view and top view of a mounting system.

FIG. 1 schematically illustrates a side view and top view of a mounting system 100 for a cabin divider 50, which is as an example illustrated as a curtain, but can likewise be an accordion partition or the like. The cabin divider 50 is configured to close the space beneath the mounting system 100, i.e. can be opened to span the entire length of the mounting system 100 (left-right extent of the mounting system 100 in FIG. 1).

The mounting system 100 comprises a curtain rail 129 configured to hold and guide the cabin divider 50, and a holding structure 110 arranged at the curtain rail 129, which will be explained in more detail with respect to FIGS. 2 to 5. The mounting system 100 further comprises a fabric cover 140 spanned over a stretcher frame 150 (FIGS. 2 to 5) and covering the holding structure 110. As may be derived from FIG. 1, the fabric cover 140 defines the outer circumference of the mounting structure 100, i.e. forms the visible outer surface of the mounting structure 100.

The mounting system 100 can further comprise at least one flexible protrusion 131, 132, 133 mounted to and protruding away from the holding structure 110 and/or the stretcher frame 150. The flexible protrusion 131, 132, 133 is arranged at a side or top of the mounting structure 100, where it can close a gap to an adjacent interior component (not illustrated).

The fabric cover 140 can be spanned over the at least one flexible protrusion 131, 132, 133. Thus, the outer circumference of the mounting structure 100, i.e. the fabric cover 140 even fills the gap to the adjacent interior component.

Figure 2:
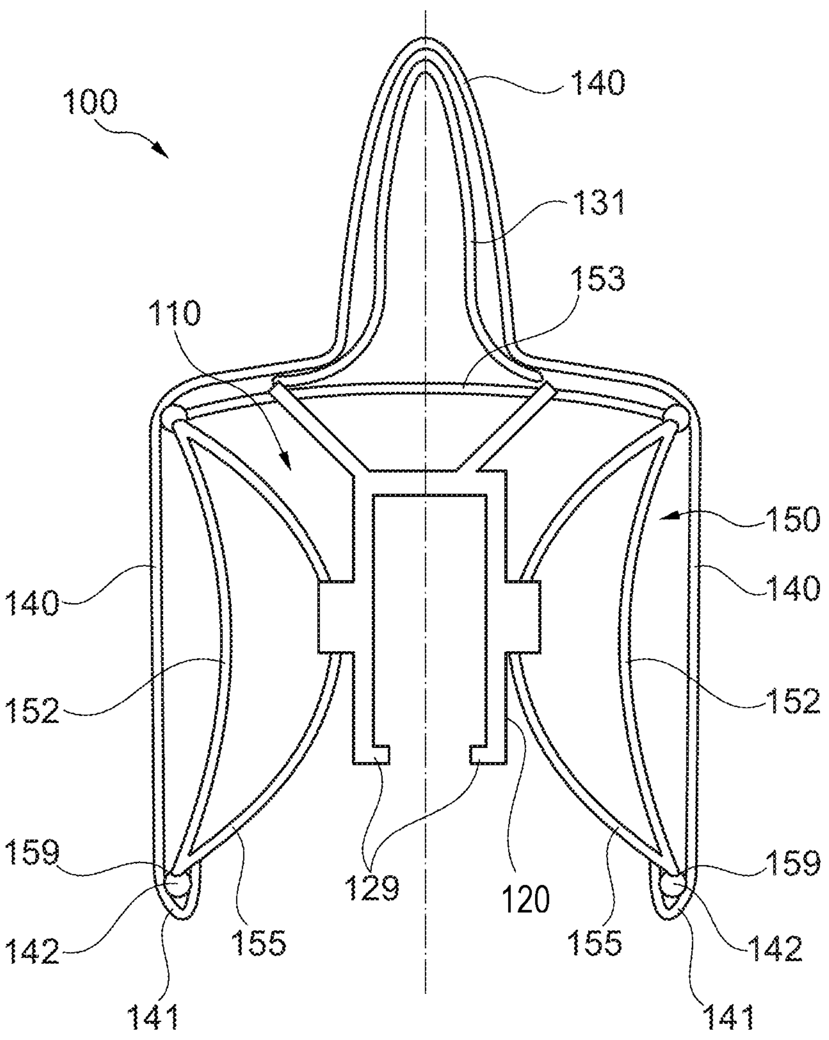
FIG. 2 schematically illustrates a cross-sectional view of an example mounting system.

FIG. 2 schematically illustrates a cross-sectional view of an example mounting system 100 and additional details of the disclosed mounting system 100. For instance, the mounting system 100, particularly the holding structure 110, comprises an interior portion 120 of any arbitrary shape. FIG. 2 only as an example illustrates an open cross-sectional shape, such as an upside to "U". Such holding structure 110 can have the curtain rail 129 mounted thereto or integrated therein (as illustrated in FIG. 2). As a mere example, the interior portion 120 of the holding structure 110 can extend over the entire length of the mounting system 100 (left-right extent of the mounting system 100 in FIG. 1). It is to be understood that the interior portion 120 may be of a different length as will be exemplarily outlined in more detail with respect to FIGS. 3 to 5.

The mounting system 100 can include a stretcher frame 150 mounted to the holding structure 110. As a mere example, the stretcher frame 150 is mounted to the holding structure 110 at opposite lateral sides of the holding structure 110. Such stretcher frame 150 can comprise at least one spacer frame 155, that is coupled to the holding structure 110 at opposite lateral sides. Furthermore, two side stretcher frames 152 can be respectively arranged on a lateral side of the holding structure 110. For example, each side stretcher frame 152 can be coupled to a respective spacer frame 155.

In addition, a top stretcher frame 153 can be arranged on a top side of the holding structure 110. While FIG. 1 illustrates corresponding coupling portions of the holding structure 110, the top stretcher frame 153 may simply be coupled to the side stretcher frames 152 and/or the spacer frames 155.

As indicated above, the mounting system 100 can include at least one flexible protrusion 131 mounted, for example, at the top of the holding structure 110 and/or mounted to the stretcher frame 150, such as the top stretcher frame 153.

The stretcher frames 152, 153 and optionally the protrusion 131 can form the frame components holding the fabric cover 140. In other words, the fabric cover is spanned over the stretcher frame 150 and optionally the protrusion 131, thereby covering the holding structure 110. The fabric cover 140 as derivable from FIG. 2 forms a continuous outer appearance of the mounting system 100. Due to its flexibility, the fabric cover 140 can be stretched and always have a neat and fitting look.

As a mere example, the spacer frame 155 as well as the stretcher frames 152, 153 can be made of a flexible material configured to bias away from the holding structure 110. Thus, if the fabric cover 140 is designed to be (slightly) smaller than the outer circumference defined by the stretcher frame 150 and optionally the protrusions 131,132, 133, the fabric cover 150 will always be stretched by the biasing forces of the stretcher frame 150 and/or the protrusion 131, 132, 133.

It is to be understood that protrusions 132, 133 can be arranged at longitudinal ends of the mounting system 100 in the same manner as the top protrusion 131 illustrated in FIG. 2.

The side edges of the fabric cover 140 can be mounted to or coupled to the stretcher frame 150 in any desired manner. On the one hand, the fabric cover 140 may be fastened to the stretcher frame 150, for example, by adhering, welding, stitching, or the like. On the other hand, the fabric cover 140 may form a keder or welting 141 that can be coupled to a keder rail 159 provided at or in the stretcher frame 150. Details of the keder rail will be explained in more detail with respect to FIG. 6.

Figure 3:
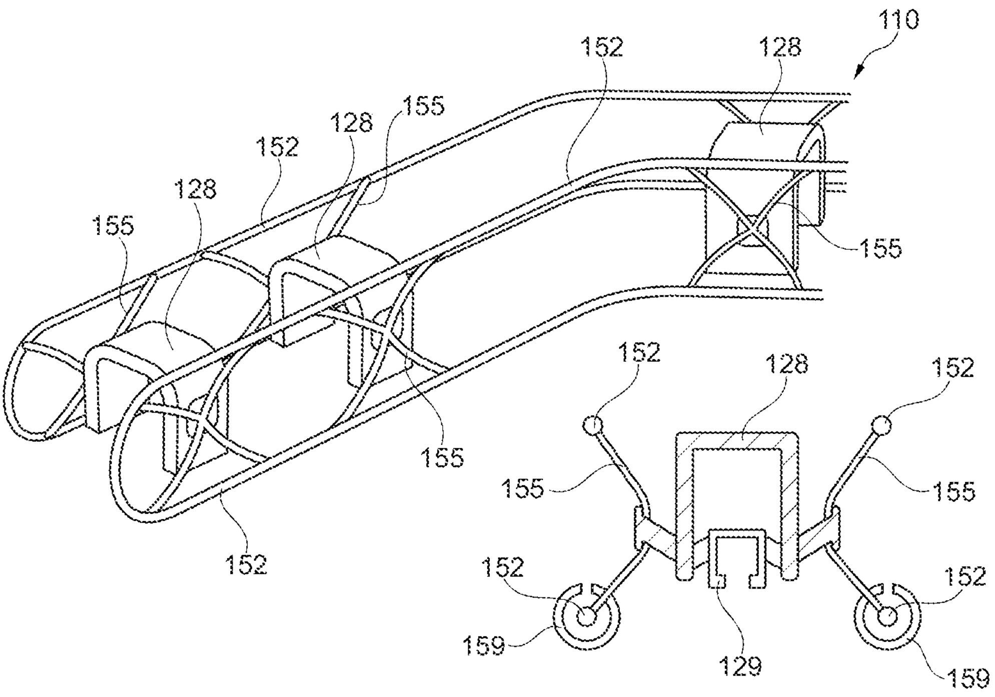
FIG. 3 schematically illustrates a perspective view and cross-sectional view of another example mounting system.

FIG. 3 schematically illustrates a perspective view and cross-sectional view of another example mounting system 100. This mounting system 100 specifically includes a holding structure 110 comprising a plurality of brackets 128. The plurality of brackets 128 is configured to hold the stretcher frame 150, for example, at lateral sides of each bracket (see also FIG. 2). The mounting system 100 of FIG. 3 distinguishes by not having a continuous holding structure 110 over the entire length (longitudinal extent) of the mounting system 100, but having distinct brackets 128.

In this example, the longitudinally load carrying structure can either be the curtain rail 129 (only illustrated in the cross-sectional detail of FIG. 3). In this case, the curtain rail 129 can be configured to be coupled at longitudinal ends of the curtain rail 129 to an interior component of an aircraft (not illustrated). Such curtain rail 129 is then further configured to carry the brackets 128 and the stretcher frame 150 mounted to the brackets 128, wherein the stretcher frame 150 holds the fabric cover 140 (not illustrated in FIG. 3).

The longitudinally load carrying structure can alternatively be the stretcher frame 150, particularly the longitudinal section 152 of the stretcher frame 150. In this case, the loads of the curtain rail (e.g. from the cabin divider 50) are transferred to the brackets 128 and further to the stretcher frame 150. In this case, the stretcher frame 150 is configured to be coupled at longitudinal ends of the frames 150 to the interior component of the aircraft (not illustrated).

FIG. 3 further illustrates example keder rails 159 provided at and/or integrated in the stretcher frame 150. For instance, at each outer bottom portion of the stretcher frame 150 one keder rail 159 is provided. This may allow the insertion of a welting 141, i.e. an edge of the fabric cover 140.

Furthermore, although FIG. 3 illustrates the bracket 128 as having an upside-down "U" shape in cross-section, it is to be understood that any shape can be employed, including a simple flat plate or an "H"-shape.

Figure 4:
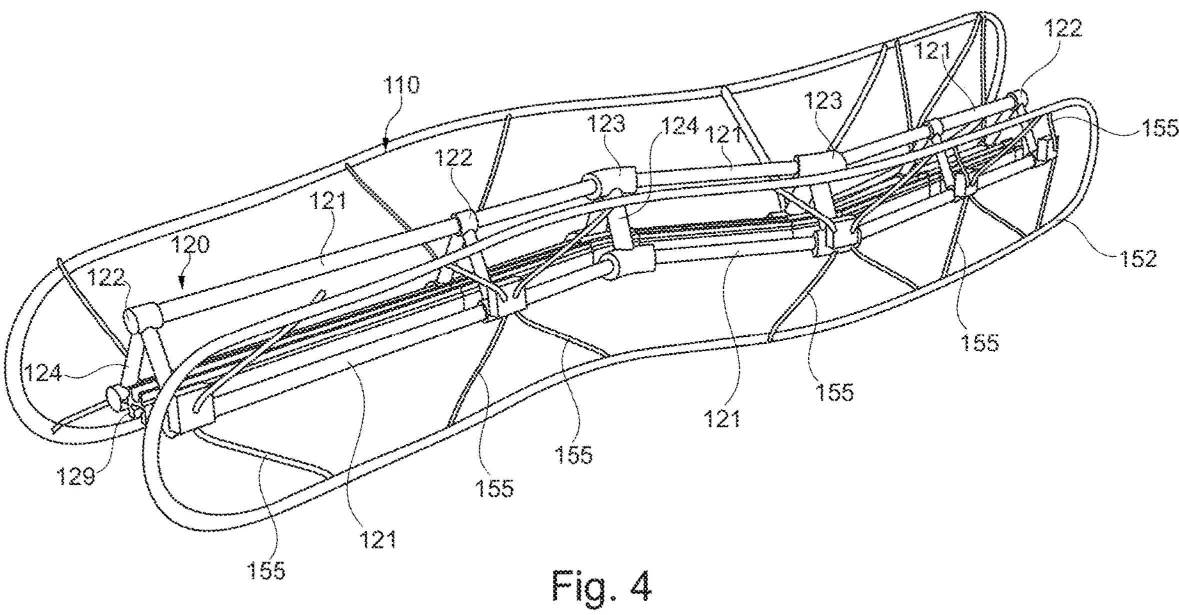
FIG. 4 schematically illustrates a perspective view of a further example mounting system.

FIG. 4 schematically illustrates a perspective view of a further example mounting system 100. This mounting system 100 distinguishes by having a holding structure 110 comprising at least one rod 121 and a plurality of rod connectors 122, 123. Particularly, each rod connector 122, 123 can be configured to receive an end of the at least one rod 121. Thus, a truss-like structure can be built from rods 121 and rod connectors 122, 123. As a mere example, the rods 121 and rod connectors 122, 123 can be standardized conventional truss components, for example as used for building booths or stages or the like.

For example, the rods 121 may be made from a lightweight plastic material, such as a (glass and/or carbon) reinforced plastic, or a lightweight metallic material, such as aluminium. Likewise, the rod connectors 122, 123 can be made from a lightweight plastic or metal material. In order to arrange multiple rods 121 parallel to one another, the rod connectors 122, 123 can pairwise be connected by a respective interconnector 124. FIG. 4 as an example illustrates triangles formed by three interconnectors 124 and three rod connectors 122, 123.

The stretcher frame 150 can be mounted to a rod connector 122, 123 and/or an interconnector 124. For instance, spacer frames 155 may be coupled to a rod connector 122, 123 and/or an interconnector 124. Longitudinal sections 152 of the stretcher frame 150 are connected to the spacer frames 155, in order to provide the stretcher frame 150 spaced apart from the rods 121.

As can be derived from FIG. 4, the curtain rail 129 can be mounted to or coupled to a rod connector 122, 123 and/or interconnector 124. Thus, the curtain rail 129 can be arranged parallel to the rods 121.

Alternatively, the curtain rail 129 can be integrated into one of the rods 121 and/or some of the rod connectors 122, 123.

Furthermore, a rod connector 123 can be curved or bent, in order to provide a curvature to the mounting system 100. Alternatively or additionally, at least one rod 121 can be curved or bent. Thus, any arbitrary overall form along the longitudinal direction of the mounting system 100 can be achieved. The curvature of the mounting system 100 can be applied with respect to a horizontal plane (curvature) as well as a vertical plane (curvature). It is to be understood that the longitudinal axis or a longitudinal direction of the mounting system 100, as well as of the curtain rail 129, may include such curvature. In other words, the longitudinal axis does not need to be straight, but can have any curved section.

Figure 5:
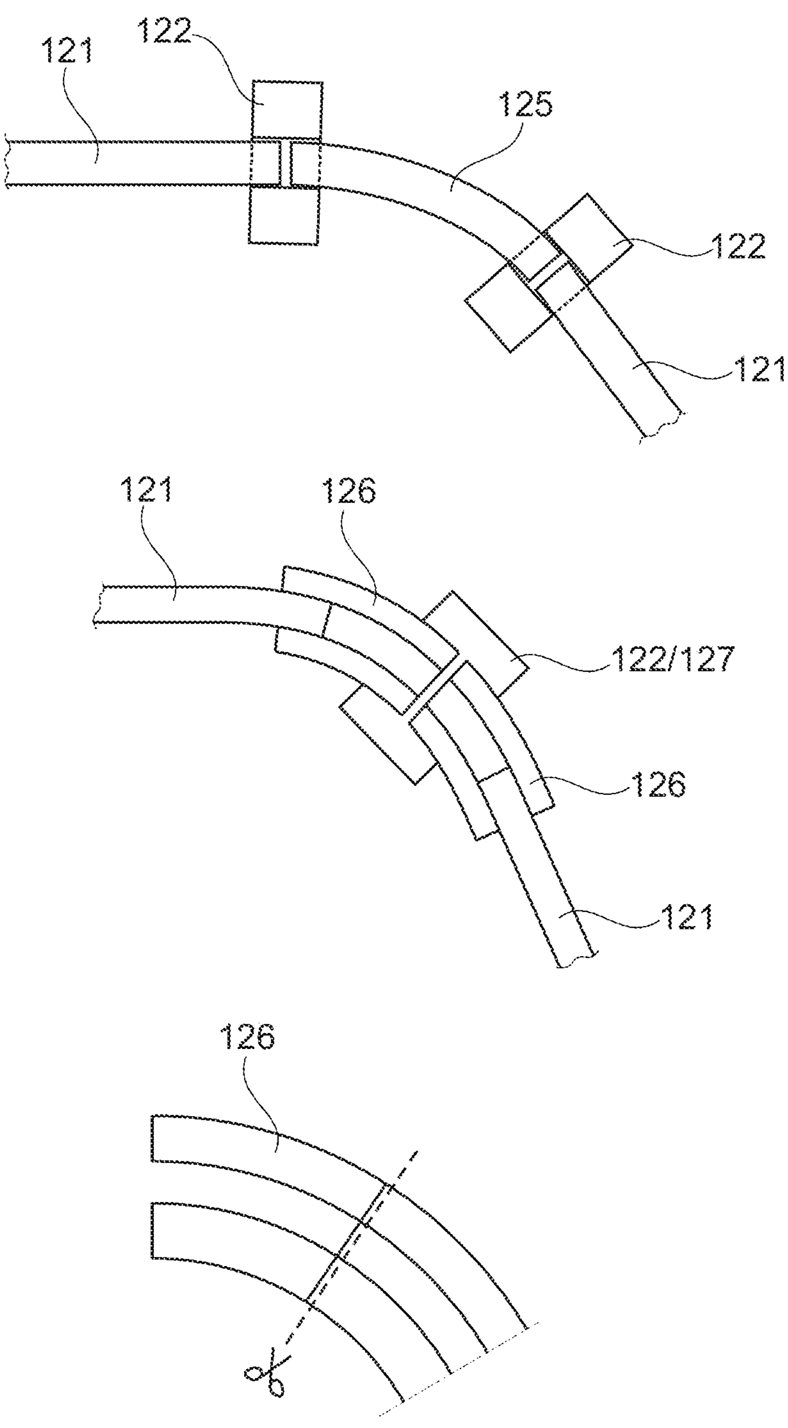
FIG. 5 schematically illustrates top views of various example holding structures for a mounting system.

FIG. 5 schematically illustrates top views of various example holding structures 110 for a curved mounting system 100. In the upper illustration of FIG. 5, a curved rod 125 is illustrated, which is coupled to respective straight rods 121 at each end via a respective rod connector 122. Based on the curvature/radius of the curved rod 125 as well as its radial length, the bend of the overall mounting system 100 can be defined.

The middle and lower drawings of FIG. 5 illustrate straight rods 121 coupled to one another via a curved or bent rod connector 126. Such rod connector 126 is configured to receive and end of one of the rods 121. Such configuration may be provided on both sides of the rod connector 126 (not illustrated). Alternatively, two such curved or bent rod connectors 126 are provided, which are further coupled to one another via a connecting structure 127. This connecting structure 127 may alternatively be a rod connector 122, wherein the respective ends of the rod connectors 126 are formed like a rod 121.

The curved rod connector 126 can be cut from a longer portion (see lower drawing of FIG. 5), in order to achieve any desired curvature of the holding structure 110 and, hence, of the mounting system 100.

Figure 6:
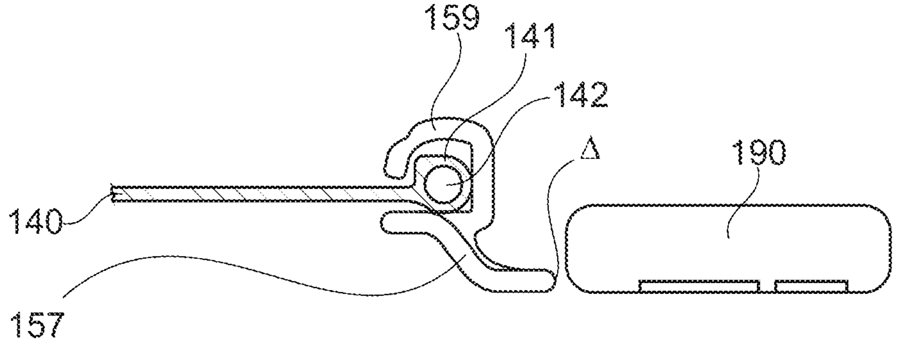
FIG. 6 schematically illustrates a top-down cross-section and front view of a mounting system having a sign.
Figure 6:
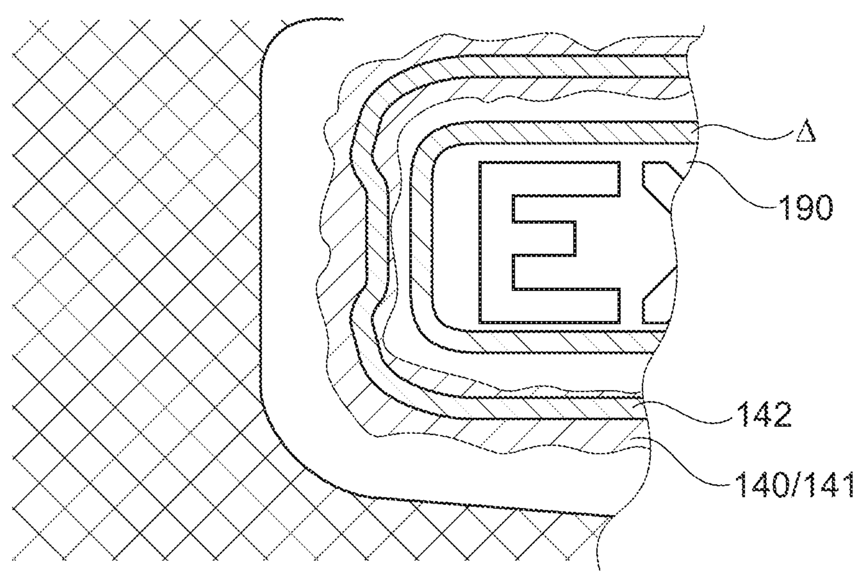

FIG. 6 schematically illustrates a top-down cross-section and front view of a mounting system 100 having a sign 190. As can be derived from the top-down cross-section (upper portion of FIG. 6), a keder rail 159 is provided, into which an edge of the fabric cover 140 is inserted. For instance, the edge of the fabric cover 140 may be looped around a cord 142 and forms a welting 141, i.e. a thicker part of the fabric cover 140 at its edge. This welting 141 is introduced, for example, pushed and slid into the keder rail 159. The keder rail 159 holds the fabric cover 140, particularly the welting 141 including the cord 142, in case the fabric cover 140 is stretched, e.g., pulled perpendicularly to the keder rail 159.

The sign 190 may be surrounded by the keder rail 159, so that the fabric cover 140 surrounds the sign 190. A cover 157 can optionally be arranged at the keder rail 159, in order to allow tolerances. Nevertheless, a gap A may still be provided between the cover 157 and the sign 190, in order to allow the sign 190 to move relatively to the keder rail 159 (e.g., if the aircraft interior is moving, for example, during turbulences).

Figure 7:
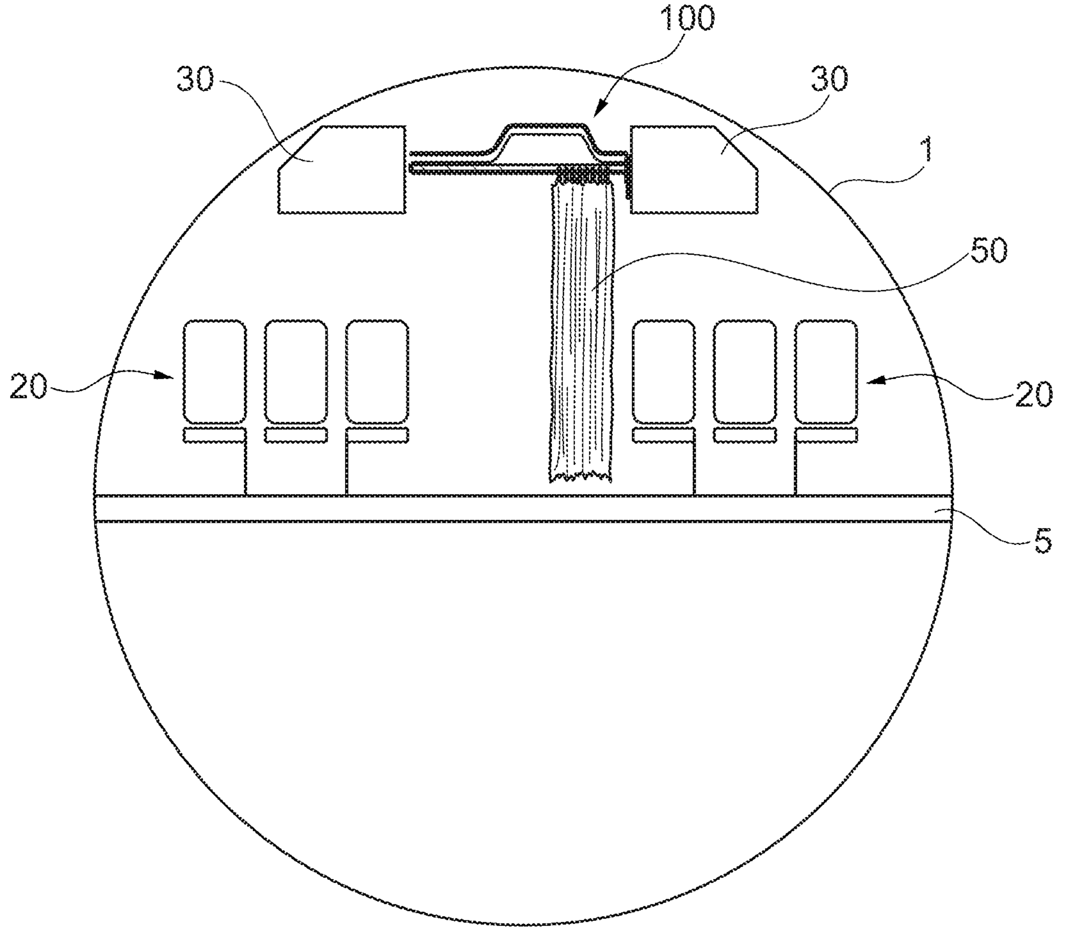
FIG. 7 schematically illustrates an aircraft comprising a mounting system.

FIG. 7 schematically illustrates an aircraft 1 comprising a mounting system 100. The mounting system 100 can be any of the mounting systems 100 illustrated and described with respect to FIGS. 1 to 6.

The aircraft 1, for example, can comprise a cabin floor 5, on which seat rows 20 are arranged. Above the seat rows 20, overhead bins 30 are arranged, to store luggage or the like. The mounting system 100 is exemplarily illustrated to span across an aisle between the seat rows 20 and between the overhead bins 30. The mounting system 100 carries a cabin divider 50, which may be closed (in a left right direction of FIG. 7). If closed, the cabin divider 50 blocks any sight along the aisle between the seat rows 20, i.e. divides the passenger cabin of the aircraft 1 along its longitudinal direction (perpendicular to the drawing plane of FIG. 7).

It is believed that the advantages of the technique presented herein will be fully understood from the foregoing description, and it will be apparent that various changes may be made in the form, constructions and arrangement of the example aspects thereof without departing from the scope of the disclosure or without sacrificing all of its advantageous effects. Because the technique presented herein can be varied in many ways, it will be recognized that the disclosure should be limited only by the scope of the claims that follow.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A mounting system for a cabin divider in an aircraft, the mounting system comprising:
- a curtain rail configured to hold and guide the cabin divider;
- a holder arranged at the curtain rail;
- a stretcher frame mounted to the holder; and
- a fabric cover spanned over the stretcher frame and covering the holder;
- wherein the holder comprises at least one rod and a plurality of rod connectors;
- wherein each of the rod connectors is configured to receive an end of the at least one rod; and
- wherein the at least one rod is arranged parallel to the curtain rail.

2. The mounting system of claim 1, comprising:
- at least one flexible protrusion mounted to and protruding away from the holder or the stretcher frame;
- wherein the fabric cover is further spanned over the at least one flexible protrusion.

3. The mounting system of claim 1, wherein the stretcher frame comprises two side stretcher frames, each of which is arranged on a respective lateral side of the holder and/or a top stretcher frame arranged on a top side of the holder.

4. The mounting system of claim 1, wherein:
- the stretcher frame comprises at least one longitudinal section arranged parallel to the curtain rail and at least one spacer frame connecting the at least one longitudinal section with the holder; and
- the at least one spacer frame is flexible and/or configured to push the at least one longitudinal section away from the holder.

5. The mounting system of claim 1, wherein:
- the holder comprises a plurality of brackets configured to hold the stretcher frame; and
- each of the plurality of brackets is mounted to the curtain rail.

6. The mounting system of claim 1, wherein one or more of the rod connectors is configured to hold the stretcher frame.

7. The mounting system of claim 1, wherein:
- the holder comprises at least one interconnector configured to connect a pair of the plurality of rod connectors spaced apart from one another in a cross-sectional direction of the curtain rail; and
- each of the pair of rod connectors is configured to receive a respective end of a pair of rods, so that the pair of rods are arranged parallel to one another and parallel to the curtain rail.

8. The mounting system of claim 7, wherein the curtain rail is coupled with the interconnector.

9. The mounting system of claim 1, wherein:
one of the at least one rod is curved, and/or
one of the plurality of rod connectors is curved, so that a pair of rods inserted into the rod connector on opposite sides are arranged at an angle.

10. The mounting system of claim 1, comprising:
a keder rail mounted to the holder and/or to the stretcher frame; and
a cord;
wherein a welting is formed at an edge of the fabric cover around the cord; and
wherein the welting is inserted into the keder rail.

11. The mounting system of claim 1, comprising:
a sign mounted to the holder and or to the stretcher frame.

12. An aircraft comprising the mounting system of claim 1.

13. The aircraft of claim 12, comprising a cabin divider mounted to the curtain rail of the mounting system.

* * * * *